United States Patent [19]
Simon

[11] 3,824,591
[45] July 16, 1974

[54] ILLUMINATED MAP
[76] Inventor: Philippe Simon, 9 avenue Gaston Boissier, 78-Viroflay, France
[22] Filed: Mar. 2, 1973
[21] Appl. No.: 337,372

[52] U.S. Cl............................................ 340/381 R
[51] Int. Cl. ............................................ G08b 5/00
[58] Field of Search .................... 340/381 R, 225 R

[56] References Cited
UNITED STATES PATENTS
2,515,387  3/1956  Riley ............................ 340/381 UX Primary Examiner—Harold I. Pitts
Attorney, Agent, or Firm—Briseboise & Kruger

[57] ABSTRACT

Information display device comprising in combination an illuminated diagram, an indicating table carrying a list of locations on said diagram, and electronic selector means. The selector means comprises a generator assembly adapted to deliver a succession of pulses over at least three output lines and to supply said lines successively, but with over-lapping periods in which two lines are simultaneously supplied. The indicating table is provided with a plurality of illuminable indicators each associated with a location listed thereon and connected to said generator assembly to be successively illuminated by the pulses therefrom. The diagram carries a plurality of illuminable indicators, each associated with a position on said diagram listed on said indicating table and connected to be lit whenever the corresponding indicator on said indicating board is lit and said pulse generator stopped.

33 Claims, 7 Drawing Figures

ILLUMINATED MAP

This is a continuation, of application Ser. No. 202,942, filed Nov. 29, 1971, and now abandoned.

SUMMARY OF THE INVENTION

Illuminated maps are commonly used to permit a person to easily visualize the route which he must travel to reach one location from another within a certain geographical zone. On these maps it is possible to cause the illumination on demand of an indicator showing his actual position and a mark showing the position of the destination to which he desires to travel, and possibly indicators showing the route to be traveled between the two positions. In order to obtain this result the user needs only to select upon an indicating table the position to which he desires to go. It will be understood that if the number of locations which appear on the indicating table is relatively high, the wiring of individual circuits of lamps for each destination appearing on the table becomes rapidly impossible. This method also requires a switch for each destination on the table, which may have substantial disadvantages if the illuminated map and associated table are to be positioned outdoors. It is the object of the present invention to provide a device comprising an illuminated map and an electronic selector which provides all the desired capabilities with reduced wiring.

This concept is directed principally to the use of an illuminated map according to the invention for the indication of geographical positions and routes on a map representative of the geographical area in question. It is, however, obvious that the invention could be used in connection with technical plans, relating for example to prototypes, or plans corresponding to games, or to any other plans. It is a further object of the present invention to provide a new article of manufacture that comprises an illuminated map equipped with an electronic selector, which map comprises an illuminatable indicator associated with each position listed on an indicator table, said indicating table having at least one light for each indicator carried on the table, characterized by the fact that it comprises in the first place a generator assembly adapted to be either manually operated by the user or automatically operated, said assembly being adapted to transmit from a pulse generator signals supplying at least three lines, which signals pass through a switch actuated by a relay, the control circuit for which actuates lighting control means. These signals are successively transmitted over said lines with an overlapping period during which two lines are simultaneously supplied. The invention also comprises in the second place, an indicating table on which the indicators are successively scanned by illuminating at least one indicator light, said table being supplied by the output lines from the generator assembly and scanning being initiated by said lighting control means. The device comprises, in the third place, a set of destination indicators, at least one indicator corresponding to each of the destinations on the map, these indicators being connected in parallel with the corresponding indicators of the table through a blocking circuit which remains open so long as the pulse generator supplies pulses.

In a preferred embodiment of the invention, a particular point, for example, the geographical position of the illuminated map, is indicated on that map by means of a position indicator supplied by a circuit which comprises a set of relay controlled switches in the generator assembly and said blocking circuit. The indicators positioned in the indicating table and on the map are lamps. Between the destination lamps corresponding to the various geographical destinations on the map and the position lamp corresponding to the position of the map itself is a series of route lamps having a set of paths to be followed. Each destination lamp on the map is electrically connected to the route lamp nearest thereto. The lighting of each destination lamp causes by chain reaction the successive lighting of all the lamps between destination lamp and the route lamp nearest the lamp indicating the location of the map itself.

In a first embodiment, the pulse generator may advantageously comprise a perforated rotating disc attached to a knob adapted to be actuated by the user. This disc turns in front of at least one light source and is interposed between that light source and at least three photoelectric cells, each of which supplies one line of the generator assembly.

The disc has eight holes, the centers of which are regularly distributed in a circle concentric with the periphery of the disc, and the generator assembly comprises three supply lines. The photoelectric cells are three in number, two of them being spaced 60 degrees apart, and the third one 160 degrees from each of the other two. The cells of the pulse generator are photoresistant cells positioned at the same distance from the axis of the disc as the holes in this disc. The rectangular pulses obtained from the three cells are transmitted to the triggers of three thyristors, the outputs of which are connected to three contacts operable by a single relay. A capacitance is connected in parallel between the outputs of each pair of thyristors so that the lighting of one extinguishes the other. The relay which actuates the switches in the pulse generator is controlled by a transistor circuit rendered conductive by the signals emitted at at least one of the outputs of the thyristors of the generator assembly. A time delay capacitance holds the relay in a position closing the switches for predetermined time. The circuit controlling the lighting is positioned in series between the control circuit of the relay and the control circuit for the light scanning the indicators on the indicating table.

The control circuit for controlling the light scanning the indicating table consists of a group of thyristors connected to one of three supply lines from the generator assembly. The scanning control thyristors are a multiple of three in number, each group of three comprising a thyristor the input of which is connected to any one of the three supply lines from the generator assembly. The output of each thyristor is connected in series with a lamp on the indicating table. The lamps are positioned on the indicating table so that scanning takes place continuously. The trigger of each thyristor of the scanning circuit is connected to the output of the thyristor corresponding to the adjacent lamp so that the lighting of one thyristor triggers the next thyristor. The triggers of each of the thyristors of the assembly are connected in succession to the point of the preceding connection to the output of the lighting control circuit. The lighting control circuit comprises a transistor which is rendered non-conductive after one of the scanning lamps of the indicating table is lighted.

The destination lamps mounted on the illuminated map are connected in series between the blocking circuit in the generator assembly and the outputs of the thyristors of the scanning control circuit of the indicating table. The route lamps positioned between each destination lamp on the map and the position lamp are each supplied by a thyristor, the trigger of which is connected to the output of the thyristor associated with one of the adjacent route lamps so that the lighting of one thyristor results in triggering an adjacent thyristor, the connection between each destination lamp and the route lamp nearest thereto being made by connecting the supply of said destination lamp that is to say the output of one of the thyristors of the scanning control circuit of the indicating table to the trigger of the thyristor associated with the route lamp in question.

It will be seen that the device according to the invention which has just been described makes it possible to obtain the desired results by using a much smaller amount of wiring, even if the number of indicators required on the indicating table is relatively large. Moreover the scanning control circuit is adapted to permit an increase in the number of locations indicated by simply adding the necessary number of groups of three thyristors, each thyristor being associated with a scanning lamp and having an output adapted to be connected to the corresponding destination lamp.

The user of the device according to this first embodiment simply operates the knob which rotates the pulse generator disc.

The rectangular wave pulse produced by the cells associated with the disc are transmitted to the triggers of the thyristors of the generator assembly, thus producing signals successively transmitted over the three supply lines of the generator assembly. These signals energize the control circuit of the relay which closes the switch in the generator assembly. The lighting control circuit is conductive since no lamp of the indicating table is lighted and it follows that the first thyristor of the scanning control circuit is triggered. The successive lighting of the scanning lamps then continues as long as the user continues to turn the control knob of the disc. If the user stops, the scanning lamp which is illuminated remains lighted but the cessation of the production of pulses renders the blocking circuit conductive, which lights the destination lamp corresponding to the lighted scanning lamp. At this moment, the thyristor of the scanning circuit corresponding to the scanning lamp which is lighted remains conductive, the trigger of the thyristor of the route circuit which is connected to the said thyristor is brought to a potential sufficient to trigger the route thyristor and light the corresponding route lamps. As indicated, the route lamps are lighted successively, beginning with the one which is nearest the position lamp which was lighted at the same time as the destination lamp. All the lighted lamps remain lighted for the time delay associated with the control circuit of the relay, that is, for example, for a time between about 30 and 60 seconds.

The second embodiment of the invention comprises automatic means for operating the generator assembly which produces the signals. This automatic means is coupled to a manual control device and goes into action at the end of a certain time when the manual control device is not actuated by the user.

It is accordingly an object of the present invention to provide, as a new article of manufacture, a device which comprises an illuminated map equipped with an electronic selector of a type which has just been described, the signals produced by the generator assembly being shaped by means of three thyristors, the outputs of which are connected to three contacts actuated by a single relay, with a capacitance connected in parallel between the outputs of each pair of thyristors so that the lighting of one extinguishes the other. The output of the manually controlled pulse generator is connected to the triggers of the three thyristors. This embodiment is characterized by the fact that the output of the manually controlled pulse generator is also connected to a monostable switch detecting the manual action of said pulse generator, the monostable switch being controlled by a bistable switch the output of which may or may not block an automatic pulse generator in dependence on the position of the bistable switch. The automatic pulse generator is connected to the three triggers of three thyristors in parallel with the manual pulse generator control. The bistable switch may be returned to its initial position by means of a time delay circuit which may be blocked for a certain length of time by the output of the bistable switch and during the rotation of the manually controlled generator through the output of the monostable switch.

In a preferred example of this second embodiment, the automatic pulse generator comprises an input permitting external synchronization control, for example, by means of a magnetophone. The automatic pulse generator comprises a unijunction transistor, the base of which is biassed by a voltage obtained through a resistance-capacitance circuit, having an adjustable time constant. The manual pulse generator is a rotating disc provided with holes attached to a knob actuated by the user, as has been described in connection with the first embodiment. The monostable switch which detects the operation of the manually controlled generator is connected to a photoelectric cell before which the rotating perforated disc moves. The time delay circuit comprises a unijunction transistor, the base of which is biassed by a voltage obtained through a resistance-capacitance circuit having an adjustable time constant. The trigger of one of the three thyristors feeding the relay-actuated triplecontact switch is connected to the positive supply by a starting condenser. The triggers of the three thyristors of the pulse generator assembly are connected in parallel to the output of the automatic pulse generator, a diode being positioned between the connection to each trigger and the output of one of the two other thyristors. The mountings of the three thyristors are identical. A capacitance is connected in parallel between the outputs of each pair of thyristors so that the lighting of one extinguishes the other.

It is a further object of the present invention to provide a third embodiment of the illuminated map which has been hereinbefore described in a general way. It has been herein proposed that the illuminated map comprise, on the one hand, a position indicator on the map corresponding to a particular position, for example, the geographic position of the apparatus consulted by the user and, on the other hand, destination lamps corresponding to each location listed on the indicator table and, finally, a series of route lamps forming a path connecting the single position lamp to the destination lamp in question. In this third embodiment, while utilizing the same method of lighting the route lamps, it is possible to optically animate the lighted route by subjecting each of the route lamps successively to a momentary increase voltage, in the sequence in which these lamps appear in the group of lamps forming a lighted path. The movement of the voltage increase from one lamp to the next corresponds on the illuminated map to the direction to be traveled to reach the position indicated by the illuminated destination lamp.

The present invention accordingly has as an object the provision of the new article of manufacture which comprises an illuminated map of the type hereinbefore described in a general manner, which map comprises an illuminated indicator associated with each position mentioned on an indicating table, said indicating table having at least one light for each location listed on the table, said map comprising, in the first place, a generator assembly actuated either by the user or automatically, which assembly produces from a pulse generator signals supplying three lines through a relay operated switch having at least three contacts controlling these lines. These signals are successively supplied to said lines with overlap in time during which two lines are simultaneously supplied with the relay circuit of the switch actuating a light control. The device comprises, in the second place, an indicating table, the indicators of which are successively scanned by the lighting of at least one luminous indicator, the table being supplied by the output lines from the generator assembly and the scanning being initiated by said light control. The device also comprises an assembly of destination indicators, at least one indicator corresponding to each destination listed on the said table, said destination indicators on the map being connected in parallel with the corresponding indicators on the table through a blocking circuit which is open so long as the pulse generator supplies pulses. The destination indicators consist of individual lamps, and the illuminated map also comprises a position lamp occupying a fixed position and route lamps illuminating the route between the position of the map and the various destinations, said route lamps being connected in parallel and each associated with a thyristor. This device is characterized by the fact that the road lamps and their associated thyristors are arranged in a sequence of N successive lamps, N being a whole number greater than 1, each thyristor associated with a route lamp being connected to a supply conductor distinct from the one associated with the adjacent thyristor, the N supply conductors of the route lamps in a sequence being connected, on the one hand, to a source of normal lighting voltage and, on the other hand, in parallel to a source of greater voltage, the latter connection being through a thyristor or transistor, the trigger or base of which is supplied by one of N outputs of a pulse generator, the N outputs of which are successively supplied in a constant order.

In a preferred embodiment of this third example, each sequence of road lamps comprises four lamps, each supply conductor is connected to an AC transformer, on the one hand, through a diode, to an intermediate point on the secondary winding and, on the other hand, to the end of the secondard winding through a thyristor. The pulse generator supplies pulses successively to each of the triggers of N thyristors associated with N supply conductors for the route lamps and comprises a unijunction transistor, the base of which is biassed by the voltage furnished by a resistance-capacitance circuit having a regulable time constant. This transistor supplies in parallel N thyristors, the N outputs of which are connected to the N triggers of N thyristors associated with N supply conductors for the route lamps, the N thyristors of the pulse generator being so connected that the lighting of one extinguishes the adjacent thyristor.

In the first variation described above it has been indicated that each route lamp is associated with a supply thyristor. The present invention has also the purpose of providing, as a fourth example, another method of supplying the route lamps, all the lamps being connected in series instead of being connected in parallel. The present invention has thus, finally, for the object of providing an illuminated map of the type hereinbefore described in a general manner in which, between a position lamp serving a fixed reference point on the illuminated map and each destination lamp corresponding to one of the destinations listed on the indicating table, is a series of route lamps tracing a route. This arrangement is characterized by the fact that all the lamps along the route are positioned in series between the destination lamp and the position lamp, the assembly being supplied through a current regulator delivering a constant voltage.

In order that the object of the invention may be better understood several embodiments thereof will now be described, purely by way of illustration and example, with reference to the accompanying drawings, in which.

Referring now to the drawings, and especially to FIGS. 1 to 4, relative to the first embodiment, it will be seen that reference numeral 1 indicates the generator assembly operated by the user of the device according to the invention, reference numeral 2 indicates the indicating table carrying the list of the different destinations, which the user may desire to reach and 3 indicates the illuminated map itself, which enables the user to visualize the destination which he has selected on the table 2 and, on the other hand, the route to be followed to reach it from the location on the map 3 which is indicated on that map by a position lamp 4. The generator assembly 1 comprises a pulse generator 5 actuated by a knob 6 which rotates about its own axis. The pulses of the generator 5 are transmitted over a circuit 7 which shapes these pulses. The pulses of the generator 5 are sawtooth waves transmitted successively over the lines 5a, 5b, 5c and the circuit 7 makes it possible to obtain on lines 7a, 7b, 7c, substantially rectangular signals. Two of these lines are supplied simultaneously for a limited time during which the signals overlap. The lines 7a, 7b, 7c are connected to a switch 8, actuated by a relay 9, controlled by a relay control circuit 10.

Figure 1:
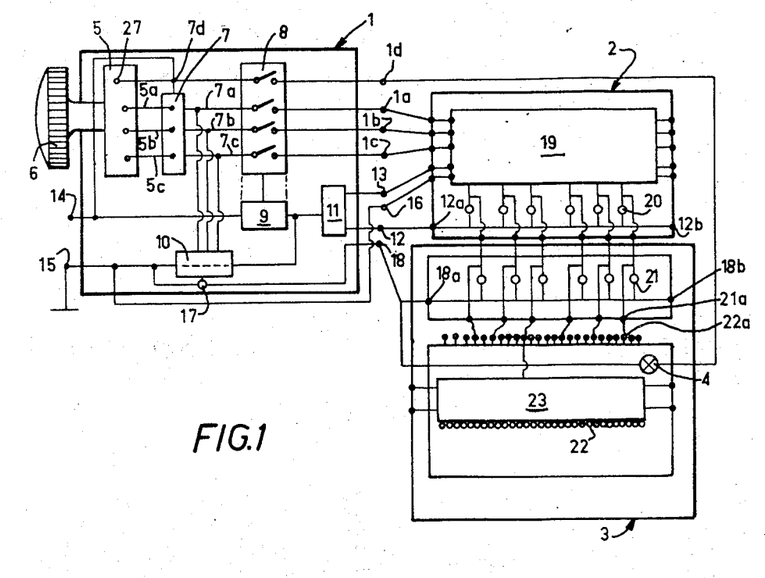
FIG. 1 schematically shows the principal circuits of a first embodiment of the device according to the invention.

The circuit 10 is connected in series with a light control circuit 11 which supplies the terminals 12 and 13 of the generator assembly. The signals produced by the generator assembly leave the switch 8 over three lines leading to the terminals 1a, 1b and 1c. The generator assembly is supplied by the positive terminal 14 of a current source, the negative terminal of which is indicated by reference numeral 15 and is grounded. The terminal 14 is connected through one of the contacts of the switch 8 to output terminal 1d of the generator assembly 1. The terminal 15 is connected to the output terminal 16 of the assembly 1. A blocking circuit 17 is associated with the control circuit 10 for the relay 9. Its input is connected to the terminal 15 and its output to a terminal 18 of the assembly 1.

The destination table 2 comprises a scanning control circuit 19 connected to a series of scanning lamps 20, each located at the right of an individual destination carried by the table 2 in a list of destinations. The table 2 may be made of a sheet of ground glass carrying aligned boxes, each box carrying the indication of a particular destination and adapted to be lighted by a lamp 20. Each lamp 20 is connected, on the one hand, to the scanning control circuit 19 and, on the other hand, to the terminal 12 of the generator assembly. All the lamps 20 thus have one terminal connected to a conductor 12a–12b which is electrically connected to the terminal 12. The scanning circuit 19 is connected to the terminals 1a, 1b and 1c, 13 and 16 of the generator assembly.

Each lamp 20 corresponds to one destination lamp 21 mounted on the illuminated map 3 of the device according to the invention. One of the terminals of each lamp 21 is connected to a conductor 18a–18b which is itself electrically connected to the terminal 18 of the generator assembly 1. The other terminal is connected to the one of the terminals of the lamp 20 which is supplied by the scanning control 19. Each destination lamp 21 has a corresponding terminal 21a which is electrically connected to a terminal 22a of whichever route circuit of the illuminated map 3 is associated with the route lamp 22 nearest the lamp 21 on the map. Reference numeral 23 indicates the circuit controlling the route lamps 22. The position lamp 4 which represents the location of the user on the map, is connected between the terminal 18 and the terminal 1d of the generator assembly 1.

Figure 2:
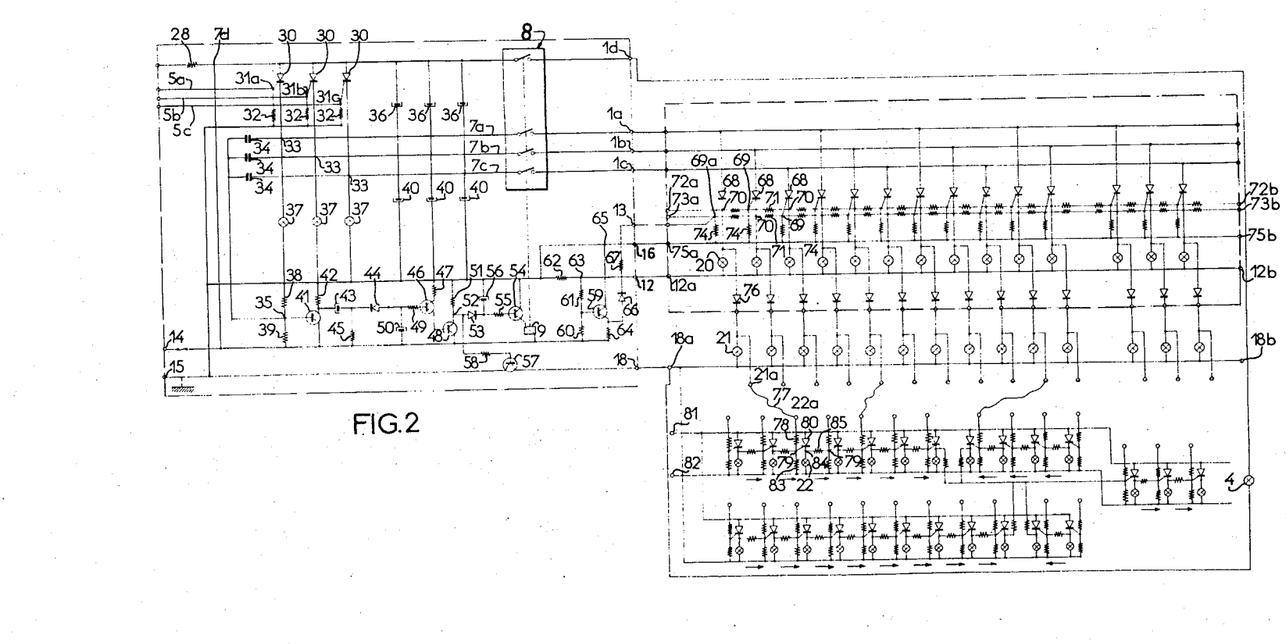
FIG. 2 shows in detail the wiring diagram corresponding to the embodiment of FIG. 1.
Figures 3, 4:
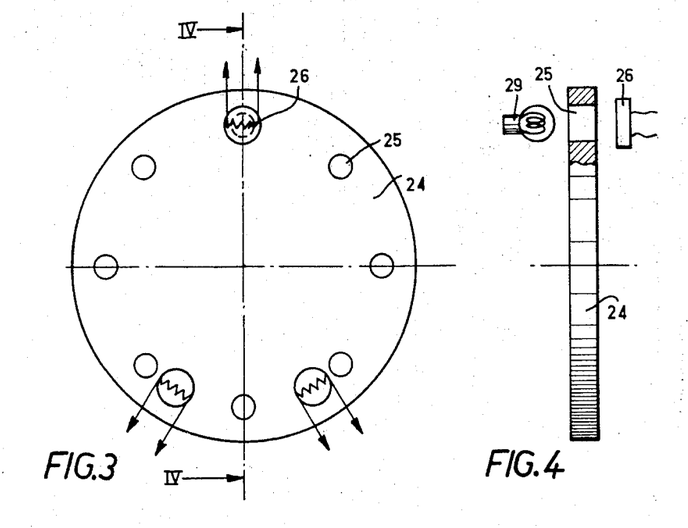
FIG. 3 shows in elevation the rotating disc of the pulse generator of the device in FIG. 1.
FIG. 4 is a cross-sectional view taken along the line IV—IV of FIG. 3.

Referring now more particularly to FIGS. 2 to 4, the various components of the device according to the invention, which has just been described in general terms, will now be set forth in detail.

The pulse generator 5 comprises a rotating disc 24 attached to a knob 6 operated by the user. The disc 24 is perforated by 8 holes 25, the centers of which are regularly distributed in a circle near the periphery of the disc. On one side of the disc 24 are three photoelectric cells 26 positioned in a circle having the same radius as the circle occupied by the centers of the holes 25. Two of the cells 26 are 60 degrees apart. The third is 150 degrees away from each of the other two. The three cells 26 have a common terminal 27 (FIG. 1) connected to the terminal 7d of the circuit 7 through a 700 ohm resistor 28 (FIG. 2). The three other terminals of the three photoresistant cells 26 are connected to the lines 5a, 5b, 5c which supply the circuit 7. On the side of the disc 24 remote from the cells 26, and opposite those cells, are the lamps 29, so positioned that the light from one of them is capable of striking the cells 26 when a hole 25 is positioned in the path of travel of that light. It will be appreciated that, with this arrangement, for each rotation of the knob 6, twenty-four substantially rectangular pulses are successively transmitted over the lines 5a, 5b, 5c.

The circuit 7 consists essentially of three thyristors 30 which are supplied through the terminal 7d and the triggers 31a, 31b and 31c of which are respectively connected to the lines 5a, 5b and 5c. The three thyristors 30 are 100 volt, 5 ampere thyristors. Each of the triggers 31a, 31b, 31c is connected to the terminal 15 through a 1000 ohm resistance 32. The outputs 33 of the three thyristors 30 are each connected on the one hand to one of the three input lines 7a, 7b, 7c of the switch 8 and, on the other hand, to a 10 microfarad condenser 34. The other plates of these three condensers 34 are all three connected to a terminal 35. 160 microfarad condensers 36 are interposed between the line 7d and each of the lines 7a, 7b, 7c. Each of the outputs 33 is connected to the terminal 15 through a lamp 37. Between the lamp 37 which corresponding to the trigger 31a and the terminal 35 is a 25,000 ohm resistance 38. Between the terminal 35 and the terminal 14 is a 5000 ohm resistance 39. A 160 microfarad condenser 40 is connected between each of the lines 7a, 7b 7c and the terminal 15.

The input terminal of the circuit controlling the relay 10 is the terminal 35. To this terminal is connected the base of a transistor 41 the input of which is connected to the terminal 14 and the output of which is connected to the terminal 15 through a 35,000 ohm resistance 42. The transistor 41 serves as a voltage amplifier and supplies a 10 microfarad condenser 40 which passes the amplified alternating pulses and transmits them to a diode 44, which passes only the negative pulses. A 25,000 ohm resistor is interposed between the terminal 14 and the connection 43–44. The diode 44 is connected to the base of a transistor 46 which passes the current when biassed by a negative voltage at its base. The output of the transistor 46 is connected by a polarizing resistance 47 to the terminal 15 and its input is connected to the base of a power transistor 48. A polarizing resistance 49 of 8200 ohms is interposed between the base of the transistor 46 and the diode 44. A condenser 50 between the terminal 14 and the resistance 49 makes it possible to space the negative pulses which pass through the circuit 10. The transistor 48 is rendered conductive when a negative voltage is applied to its base. Its output is connected to the terminal 15 through a 50 ohm resistor 51 and its input is connected to the terminal 14.

The output 52 of the transistor 48 is connected to a diode 53 in the supply line to the base of a transistor 54 through a resistance 55 of 5000 ohms. The transistor 54 is of the NPN type and is rendered conductive when a positive voltage is applied to its base. Its output is connected to the terminal 15 and its input to one of the terminals of the relay 9, the other terminal of which is connected to the terminal 14. A 5,000 microfarad condenser 56 is located between the diode 53 and the resistance 55 on the one hand and the terminal 15 on the other hand.

The blocking circuit 17 comprises a power transistor 57, the base of which is connected to the output 52 of the transistor 48 through a 100 ohm resistor 58. The output of the transistor 57 is connected to the terminal 15 and the input to the terminal 18. The light control circuit 11 comprises a transistor 59 and base of which is connected on the one hand to the terminal 14 through a 10,000 ohm resistor 60, and, on the other hand, to the terminal 15 through a 5,000 ohm resistor 61 and a 1 ohm resistor 62. The median point 63 between the resistances 61 and 62 is connected to the terminal 12. The input to the transistor 59 is connected to the terminal 14 by a 1,200 ohm resistor 64 and its output 65 is connected to the terminal 15. The input of the transistor 59 is connected to the terminal 13 through a diode 66 and a 5,000 ohm resistor 67.

The scanning circuit 19 consists essentially of 50 volt, 1.6 ampere thyristors 68. The thyristors 68 are arranged in groups of three. In each group the input of one thyristor is connected to the line 1a, that of the following to the line 1b, and the third to the line 1c. The trigger 69 of one of two adjacent thyristers 68 is connected to the output 70 of the other through a 20,000 ohm resistor 71. This results in two alternative connecting lines between 69 and 70 one of which leads to the terminals 72a and 72b and the other of which leads to the terminals 73a, 73b. The trigger 69a of one of the thyristors 68 of the scanning control circuit 19 is connected to the terminal 13. All the triggers 69 and 69a are connected to the output 65 of the transistor 59 by 1,000 ohm voltage stabilizing resistors 74 through a line 75a, 75b. Each of the thyristor outputs 70 is connected to a lamp positioned at the right of a destination indicating box on the table 2, the other terminal of the lamp 20 being connected to the terminal 12. The output 70 of each thyristor 68 is also connected through an isolating diode 76 to a lamp 21, the other terminal of which is connected to the terminal 18 by a conductive line 18a, 18b. The terminal of each lamp 21 which is not connected to the line 18a, 18b is connected to a terminal 21a. Each lamp 21 corresponding to a predetermined destination on the lighted map according to the invention, which corresponds in turn to the destination indicated by the box associated with the lamp 20, which is connected to the lamp 21 through a diode 76.

The route circuit 23 is supplied through input terminals 28a each of which corresponds to a lamp 22. The connection between the circuit 23 and the destination lamps 21 on the map is made by a flexible wire 77 which connects a terminal 21a of a lamp 21 to the terminal 21a of the route lamp 22 which, on the illuminated map, is nearest to the lamp 21. The terminal 22a is connected by a resistance 78 to the trigger 79 of a 50 volt, 0.2 ampere thyristor 80. The input of the thyristor 80 is supplied from the terminal 81 of an AC source, the other terminal of which is connected to the output of the thyristor 8 through the lamp 22 associated with said thyristor 80. Between the trigger 79 and the terminal 82 is a polarizing resistance 83 having a value of 1,000 ohms. The output 84 of each thyristor 80 is connected to the trigger 79 of the thyristor associated with the adjacent lamp 22 through a 1200 ohm resistance 85.

This arrangement makes it possible, when a lamp 22 is illuminated by triggering a thyristor 80, to simultaneously trigger the adjacent thyristor to light the adjacent lamp 22 and thus consecutively cause the lighting of all the lamps 22 from the lamp 21 up to the position lamp indicating the location of the map itself, one terminal of which is connected to the terminal 1d and the other to the terminal 18.

The operation of this apparatus is as follows: When the user turns the knob 6 he produces on the line 5a, 5b, 5c saw-tooth pulses which successively trigger the thyristors 30. The first thyristor triggered produces a substantially rectangular signal at its output 33 until lighting of adjacent thyristor 30 causes its extinction by inversion of the charge of the condensers 34. This produces on the line 7a, 7b, 7c rectangular waves successively distributed in time over each line and then on the following line, with simulataneity existing for a relatively short time between the signal which passes over one line and the signal which passes over the adjacent line. The shape of the resulting signals is modulated by the condensers 36 and 40. When signals are thus produced on the lines 7a, 7b, 7c, the base 35 of the transistor 41 becomes negative and the transistor 41 becomes conductive. Alternating pulses are thus amplified and the diode 44 passes only the negative part of these pulses. The condenser 50 spaces the negative pulses thus obtained, which act on the base of the transistor 46 which then becomes conductive. The base of the power transistor 48 is thus rendered negative and it becomes conductive. The output 52 of this transistor 48 is then positive and transistor 57 is blocked so that the terminal 18 is no longer supplied and no lamp 21 can be lighted. The diode 53 being conductive for positive voltages the base of the tansistor 54 is made positive so that this transistor becomes conductive, which closes the relay 9 and the four contacts of the switch 8. This supplies the terminals 1a, 1b, 1c and the three corresponding lines with successive substantially rectangular signals. During this operation the condenser 56 charges.

The trigger 69a of one of the thyristors 68 is at a positive potential by reason of the fact that the diode 66 is conductive for positive voltages and connected to the terminal 14 through the resistance 64. In the example described, the thyristor 68 which corresponds to the trigger 69a is connected to the supply line 1a. When a substantially rectangular wave appears at the line 1a, upon closing of the switch 8, the thyristor 68 is supplied, and, since its trigger 69a is at a positive potential, consequently rendered conductive. This permits the lighting of the lamp 20. The lighting of the lamp 20 brings the point 63 to a positive potential which brings the base of the transistor 59 to a positive potential and renders this transistor conductive. It follows that the input of the transistor 59 is brought to a negative potential so that the trigger 69a is also brought to a negative potential which, at the end of the signal transmitted by the line 1a subsequently prevents relighting of thyristor 68. The passage of current through the thyristor 68 which the corresponds to the trigger 69a brings to a positive potential the trigger 69 of the thyristor 68 adjacent thereto by reason of the connection through the resistor 71. When the signal through the first thyristor 68 terminates, the beginning of a signal appears on the line 1b, and consequently, at the input of the adjacent thyristor 68. Since it is in firing condition, it becomes conductive and all the thyristors 68 are thus successively triggered and become extinguished at the end of the signal along the corresponding line. It should be noted that the duration of a signal depends essentially on the speed of rotation of the knob 6 by the user. This assures the scanning of all the indicators carried on the indicator table 2 by the successive lighting of all the lamps 20.

When the user stops rotating the knob 6, one of the lamps 20 is lighted due to the supply of its corresponding thyristor 68. At this moment the negative voltage which has been generated by the pulses at the base of the transistor 41 disappears, so that this transistor is no longer conductive. Then the negative voltage at the base of transistor 46 also disappears as well as that at the base of transistor 48. The power transistor 48 is thus no longer conductive and the voltage at its output 52 becomes negative, which unblocks the transistor 57, so that the terminal 18 is electrically connected to the terminal 15. The lamp 21 positioned between the conductive line 18a, 18b and the lamp 20, which is lighted at the moment of this operation, is also lighted, as is the destination lamp on the map which corresponds to the destination indicated by the lighted lamp 20. The route lamp 22, which is connected by a wire 77 to the destination lamp 21 which has just been lighted is then supplied because the trigger 79 of its associated thyristor 80 is brought to a positive potential by lighting of the lamp 21. The lighting of this lamp 22, which is the route lamp nearest the destination lamp 21 which has just been lighted, brings the potential of the trigger 79 of the adjacent thyristor 80 to a positive value, thus firing the adjacent thyristor. All the thyristors 80 between the first route lamp 22 which has been lighted and the route lamp 22 nearest the position lamp 4 are thus successively lighted. When the transistor 57 is unblocked the supply circuit of the lamp 4 is closed, which lights the lamp 4. It is of course possible to insert in the supply circuit of the lamp 4, for example between this lamp and the switch 7, a blinker making it possible to distinguish the lamp 4 from the other lamps which are lighted on the luminous map.

It is important to note that the circuits of the indicating table 2 may be supplemented by adding successive modules which simply prolong lines 72a–72b, 73a–73b, 75a–75b 12a–12b, and 18a–18b. It is thus possible to start with an illuminated map and an indicating table already in service and increase the number of indications carried by the table without substantially modifying the structure of the existing circuits. It is clear that, in this case, when it is desired to complete in a suitable manner the number of route lamps, it is necessary to position the new lamps on the map and provide a flexible connection between the new positions in the arrangement and the nearest route lamps.

Figure 5:
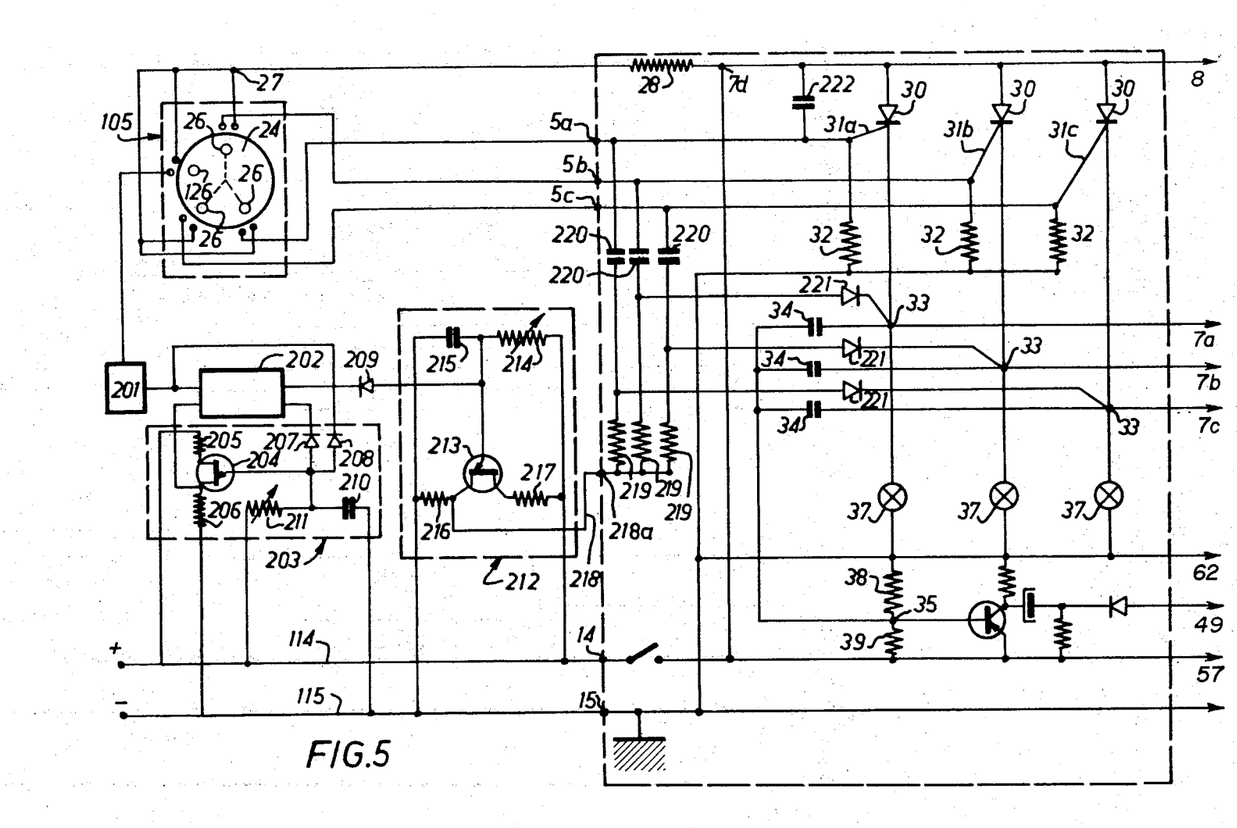
FIG. 5 schematically shows part of the wiring of an embodiment of pulse generating means for the illuminated map according to the invention, in which there is both a manually operated and an automatic pulse generator.

FIG. 5 schematically shows one part of the generator assembly according to a second embodiment of the invention, the part at the right of the broken line being identical to the corresponding part described in connection with the first embodiment and shown in detail on FIG. 2. Since we are simply concerned with a modification of the structure described in the first embodiment, the same reference numerals have been used for those components which are identical in the two embodiments.

The generator assembly comprises a pulse generator 105 which is manually actuated, said generator being analogous to the one which has been described in connection with the first embodiment. The manually controlled pulse generator 105 comprises a rotatable disc 24 attached to a knob which can be actuated by the user. The disc 24 comprises 8 holes which move in front of three photoresistant cells 26 as has been described with respect to the first embodiment. A complementary cell 26 is positioned opposite the circle described by the centers of the holes in the disc 24. The three cells 26 and the cell 126 have a common terminal 27. The three other outputs of cells 26 are connected to the lines 5a, 5b, 5c, which supply the pulse-shaping circuit. The supplemental cell 126 has its output connected to a monostable switch 201, the output of which is connected to a bistable switch 202. A time delay circuit 203 is connected to the bistable 202. This circuit comprises a unijunction transistor 201 the input and output of which are respectively connected through resistances 205 and 206 of 150 ohms each to the positive supply line 114 and negative supply line 115. The base of the transistor 204 is connected by diodes 207 and 208 respectively to the output and input of the bistable 202. Between the resistance 206 and the transistor 204 is a connection to the input of the bistable 202. The base of the transistor 204 is also connected to a resistance-capacitance circuit consisting of a 20 microfarad condenser 201 and an adjustable resistance 211. The resistance 211 is connected to the positive line 114 and the capacitance 210 to the negative line 115. The time constant of this circuit 210–211 may be adjusted by regulating the resistance 211. The output of the bistable 202 is connected through a diode 209 to an automatic pulse generator 212.

The generator 212 comprises a transistor 213, the base of which is connected to a resistance-capacitance circuit consisting of an adjustable resistance 214 connected to the positive supply line 114 and a 10 microfarad condenser 215 connected to the negative supply line 115. The input collectors and outputs of the transistor 213 are provided with resistances 216 and 217 of 150 ohms each which connect them respectively to the lines 115 and 114. The output 218 of the automatic pulse generator is connected between the transistor 213 and the resistance 216. This output is connected to the terminal 218a of the pulse shaping circuit. The pulse shaping assembly is of the same design as in the first embodiment. It comprises three thyristors 30 which are supplied through the terminal 7d and the triggers 31a, 31b, 31c of which are respectively connected to the lines 5a, 5b, and 5c.

For details of the arrangements of this pulse shaping circuit reference may be made to the description of the first embodiment.

In the part of the generator assembly which has been illustrated on FIG. 5 the automatic pulse generator 212 is connected in the following manner. The terminal 218a is connected to each of the three lines 5a, 5b, 5c, through a 500 ohm resistor 219 and a 0.1 microfarad capacitor 220 connected in series. The terminal 218a is also connected to each of the three output terminals 33 through resistances 219 and diodes 221. An 0.1 microfarad condenser 222 is positioned between the trigger 31a and the terminal 7d. It will be seen that the device which has just been described makes it possible to control the pulse-shaping circuit consisting of the three thyristors 30 either by means of pulses from the manually operated generator 105 or by means of the automatic pulse generator 212. In effect, when the disc 24 is rotated by the user he obtains as has been indicated in the preceding descirption successive pulses along the lines 5a, 5b, 5c, which give rise to saw-tooth pulses spaced over the lines 7a, 7b, 7c. This results in scanning of the indicators carried by the indicating table.

During this rotation of the disc 24, the cell 126 delivers pulses to the monostable 201 which changes position at each reception of a pulse and returns immediately thereafter to its initial position. The monostable 201 thus transmits pulses to the bistable 202 which change the state of this bistable and block, through the doide 209, the charging of the condenser 215 because the output of the bistable 202 becomes negative. The time delay circuit 203 is blocked by the diode 208 to the extent that the monostable 201 delivers pulses to the bistable 202, that is to say as long as the disc 24 is in rotation. When the user stops rotating the disc 24 the time delay circuit 203 is no longer blocked, and after a time delay which depends on the time constant of the circuit 210–211, the delay circuit 203 transmits to the bistable 202 a pulse which returns the bistable 202 to the equilibrium state which it occupied before receiving the first pulse from the monostable 201, that is to say, before the user started rotating the disc 24.

When the user ceases to rotate the disc 24, it will thus be seen that the bistable, at the end of a certain time delay, permits the charging of the condenser 215 and the operation of the automatic pulse generator 212. In this generator, of a conventional type, the transistor 213 delivers at its output 218 pulses separated by the charging time of the circuit 214–215, the time constant of which may be regulated by adjusting the adjustable resistance 214. It will thus be seen that when the user no longer operates the disc 24, after the expiration of the time delay of the time delay circuit 203, pulses appear at the terminal 218a which are regularly spaced in time. These pulses are transmitted by the circuits 219 and 220 to the triggers 31i a, 31b, 31c of thyristor 30. It should be noted that, from the time that the voltage is applied to the assembly, the condenser 222 fires the thyristor 30 having the trigger 31a, which causes lighting of the corresponding lamp 37. The diode 221 connected to this thyristor thus does not block it so that a pulse is delivered to the trigger 31b which fires the second thyristor 30 and causes the preceding thyristor to be rendered non-conductive by one of the condensers 34. It will thus be seen that the successive firing and cutting off of the thyristors 30 is obtained as the consequence of the pulses supplied to the terminal 218a, so the automatic generator 212 exactly replaces the manually controlled generator constituted by the disc 24. The device according to this second embodiment makes it possible to continuously scan the indicators of the indicating table, even when the user is not operating the control knob on the manual control generator. Any actuation by the user of this control button suppresses the operation of the automatic generator, and the latter is not brought back into action until after a time delay permitting the user to consult the illuminated map after he has stopped at a particular indication on the indicating table.

Figure 6:
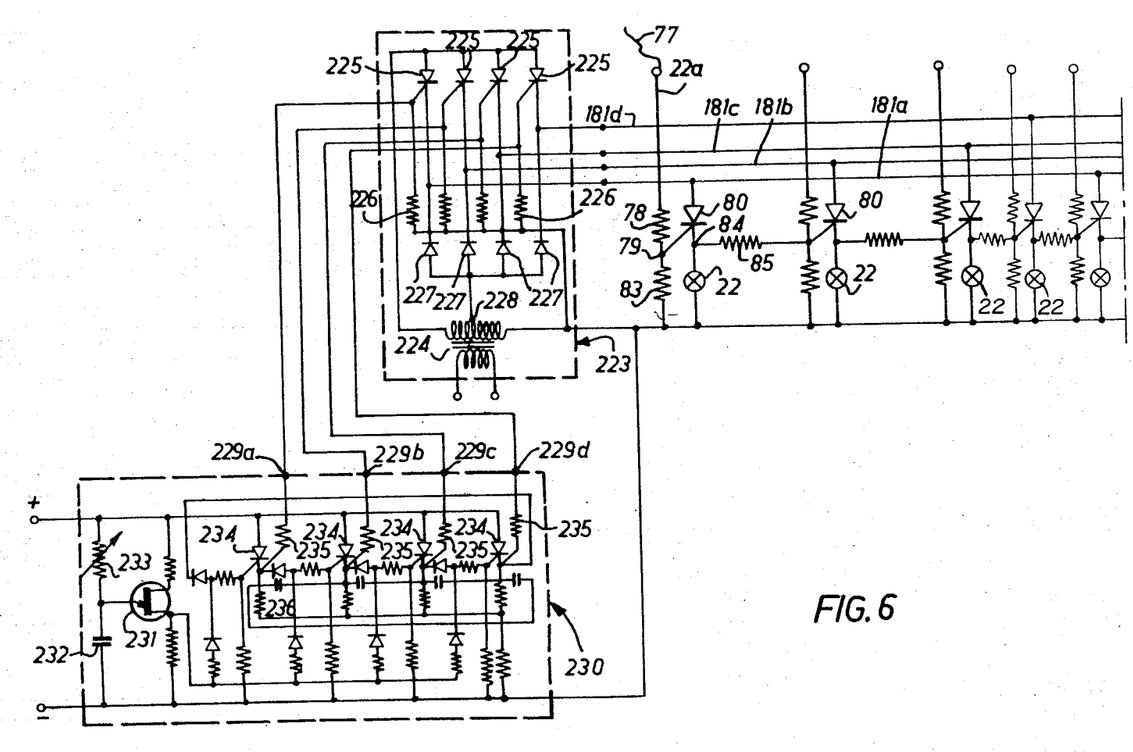
FIG. 6 shows in detail part of the circuit diagram corresponding to a third embodiment in which the route lamps positioned between each destination lamp and the single position lamp on the map are subjected to a temporary increase in voltage animating the route along which travel is necessary.

FIG. 6 shows a third embodiment of the device according to the invention. This improvement relates to the provision of luminous routes on the map of the device according to the invention. In the example envisaged in the first embodiment the route lamps are each lighted by a thyristor 30, all of the thyristors being connected in parallel. This general arrangement has been retained, but the lighted route has been animated by supplying the lamps of the pathway with a momentarily increased voltage and causing this increased voltage to travel from one lamp to the next within a sequence of lamps. In the example illustrated on FIG. 6, only the part of the wiring corresponding to the illuminated map and the route lamps 22. All of the parts relating to the pulse generator, on the one hand, and the indicating table, on the other hand, are presumed identical to those which have been described in connection with the first embodiment and illustrated in detail on FIG. 2. Components which are identical to those disclosed in the two previously described embodiments have been given the same reference numerals.

The route circuit comprises input terminals 22a, each of which corresponds to a lamp 22. The route circuit and the destination lamps of the apparatus according to the invention are connected by flexible wires 77. The terminal 22a is connected by 10,000 ohm resistor 78 to the trigger 79 of a 50 volt, 0.2 ampere thyristor 80. The output of each thyristor 80 is through a lamp 22 and all the outputs are connected to the common terminal 82.

Between the trigger 79 of each thyristor 80 and the terminal 82 is a polarizing resistance 83 having a value of 1,000 ohms. The thyristors 80 are grouped in sequences of four and their inputs are respectively connected to conductors 181a, 181b, 181c, 181d, each thyristor in a sequence being connected to a single one of these conductors and the order of connection of the thyristors of a sequence being the same for all sequences. The output 84 of a thyristor 80 is connected to the trigger 79 of the thyristor associated with the adjacent lamp 22 by a resistor 85 having a value of 1,200 ohms. This arrangement makes it possible, when a lamp 22 is illuminated by a thyristor 80, to simultaneously trigger the adjacent thyristor to light the adjacent lamp 22 and thus to obtain the step by step lighting of all the lamps 22 between the destination lamp which has lighted and the position lamp on the illuminated map.

The thyristors are supplied by a voltage 223. This generator comprises a transformer 224, the primary winding of which is connected to an alternating circuit source. The secondary winding has one end connected to the terminal 82 and the other end connected to the inputs of four thyristors 225, the triggers of which are connected to the terminal 82 by resistances 226. The outputs of the thyristors 225 are connected to four supply conductors 181a, 181b, 181c, 181d, and the points of connection are also connected in parallel through diodes 227 to an intermediate point 228 on the secondary winding of the transformer 224. The triggers of the thyristors 225 are each connected to one of the four outputs 229a, 229b, 229c, 229d, of a pulse generator 230.

The pulse generator 230 is of a conventional type and comprises a transistor 231 the base of which is connected to a circuit formed by a 10 microfarad condenser 232 and a variable resistance 233. The transistor 231 is connected as indicated in FIG. 6 to four thyristors 234, the outputs are connected through 5,000 ohm resistances 235 to the terminals 229a, 229b, 229c, 229d. The condensers 236 make it possible to extinguish a thyristor 234 when the adjacent thyristor is fired. All the pulses from the transistor 231 are supplied in parallel simultaneously to all the thyristors 234. The first thyristor 234 to fire causes its output terminal to be supplied, followed by the firing of the adjacent thyristor and so on, so that the generator 230 makes it possible to obtain at the output terminals pulses passing successively from one terminal to the next in sequences of four in a defined order.

The pulses obtained from the generator 230 are supplied to the triggers of the thyristors 225. Each time that a pulse arrives at the trigger of the thyristor 225 the thyristor becomes conductive so that the supply conductor 181a, 181b, 181c, or 181d connected to the output of this thyristor is supplied through this tryristor with the increased voltage corresponding to the total secondary winding of the transformer 224. While one of the thyristors 225 is rendered conductive, the others are not, so that the three conductors 181a, 181b, 181c, and 181d which are not subjected to the high voltage are supplied by the diode 227 with a normal voltage obtained from the part of the secondary winding of the transformer 224 which terminates at the intermediate terminal 228. It will thus be seen that, for a path corresponding to a series of lighted lamps 22, the supply voltage will be the normal voltage for three lamps of a sequence of four and a higher voltage for the fourth of these lamps, it being understood that the lamp supplied with the higher voltage varies in the sequence of four in a regualr manner and in a regular order of succession. The inputs of the thyristors 80 are so connected that the excess voltage applied to a series of four lamps affects the lamps 22 in the direction of travel from the position lamp of the illuminated map to the destination lamp which has lighted all the route lamps 22. There is thus provided, in each series of four route lamps a light which moves in the direction which the user must follow to go from the place marked by the position lamp to the place indicated by the destination lamp. The optical effect corresponds to an animation showing the direction of movement on the illuminated map.

Figure 7:
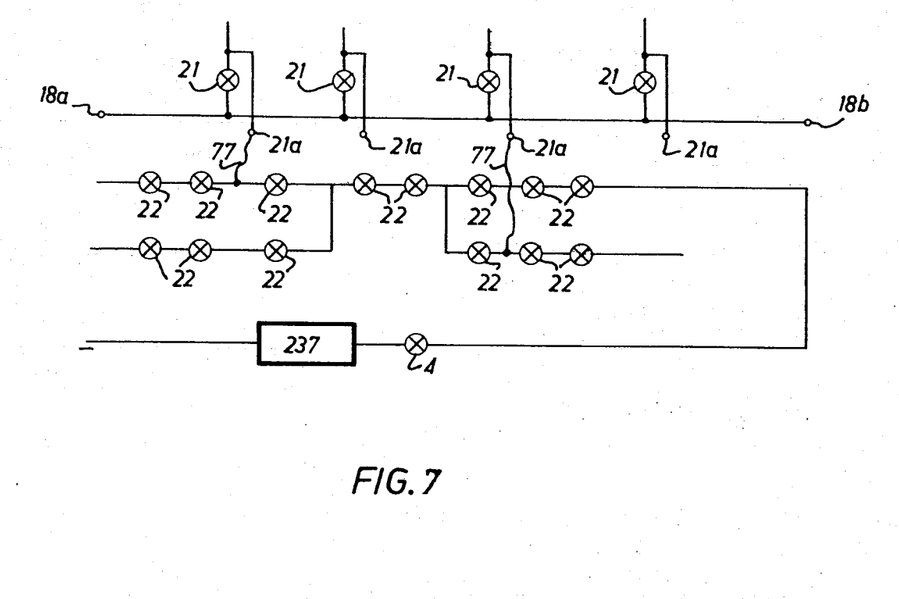
FIG. 7 shows part of a circuit diagram for a fourth embodiment in which the road lamps of the illuminated map are positioned in series.

FIG. 7 represents the fourth embodiment of the invention. This improvement relates exclusively to the connection of the route lamps which are positioned between each of the destination lamps 21 of the illuminated map and the position lamp 4 which corresponds to the place at which the illuminated map is being consulted by the user. FIG. 7 therefore shows only part of the connections corresponding to the route lamps and reference should be made for the rest of the installation to the device which has already been described as the first embodiment and illustrated on FIG. 2. The same reference characters are applied to identical components in both embodiments. The destination lamps 21 on the illuminated map are supplied through a diode not illustrated on the figure and when lamp 21 is supplied, this results in the supply of the corresponding terminal 21a. This terminal 21a is connected through a flexible conductive wire 77 to the nearest route lamp 22. Along each route on the illuminated map between a destination lamp and the position lamp 4 route lamps are mounted in series. A predetermined route is supplied when the terminal 21a is positively fed by the flexible wire 77 corresponding to that terminal through all the route lamps 22 of the route under consideration in series, through the position lamp 24, and finally through a voltage regulator 237 connected to the negative supply terminal. The constant voltage regulator 237 may be of the type described in the book "Transistor Manual," 7th edition published by the General Electric Corporation, at page 233.

When one of the destination lamps of the illuminated map is supplied as has been hereinbefore indicated in detail the terminal 21a is supplied and all the road lamps 22 in series with the terminal 21a are also supplied at a constant voltage dure to the regualtor 237. In certain cases such a connection of the road lamps 22 may be more desirable than the connection in parallel described in the previous embodiment, since the connection in parallel requires the use of a thyristor for each road lamp 22.

It will of course be appreciated that the embodiments which have been described have been given purely by way of illustration and example, and may be modified as to detail without thereby departing from the basic principles of the invention, as defined by the following claims.

What is claimed is: 9
What is claimed is:

1. Information display device comprising in combination an illuminated map, an indicating table carrying a list of locations on said map with an individual illuminable indicator for each location listed, and electronic selector means, said selector means comprising a pulse generator adapted to deliver signals over at least three output lines successively with overlapping periods in which the two lines are simultaneously supplied, a relay having contacts controlling said output lines, a relay control circuit controlling said relay, and a lighting control circuit supplied through said relay control circuit;

the illuminable indicators on said indicating table being supplied through said generator output lines and successively illuminated under control of said lighting control circuit; and said map being provided with a plurality of illuminable destination indicators, one at each location listed on said indicating table, and each of which is connected in parallel with the corresponding illuminable indicator on said indicating table through a blocking circuit which remains open so long as the pulse generator supplies pulses.

2. Device as claimed in claim 1 in which a reference point on the map is marked by a position indicator in series with said relay and blocking circuit.

3. Device as claimed in claim 2 in which the illuminable indicators on the indicating table and on the map are lamps.

4. Device as claimed in claim 3 comprising, between position lamp on said map corresponding to said reference zone and the destination lamps on said map corresponding to each of the locations listed on the indicating table, a series of route lamps representing the route to be traveled between said reference zone and destination, each destination lamp being electrically connected to the nearest route lamp, and the lighting of each destination lamp causing the lighting of all the route lamps between it and the route lamp nearest the position lamp.

5. Information display device comprising in combination an illuminated diagram, an indicating table carrying a list of locations on said diagram with an individual illuminable indicator for each location listed, and electronic selector means, said selector means comprising a pulse generator connected to deliver a succession of pulses over at least three output lines simultaneously and to supply said lines successively, but with overlapping periods in which two lines are simultaneously supplied, means for interrupting said pulse supply, and means connected to said output lines and responsive to said pulses for successively illuminating each of the indicators on said indicating table, said diagram carrying a plurality of illuminable indicators indicative of the locations on said diagram listed on said indicating table, and said device further comprising means for lighting at least one indicator on said diagram indicative of a particular location on said diagram whenever the indicator for said location on said indicating table is lit and said pulse supply is interrupted.

6. Information display device as claimed in claim 5 in which said selector means comprises a relay having contacts controlling said output lines, a relay control circuit controlling said relay, and a lighting control circuit supplied through said relay control circuit, the illuminable indicators on said indicating table being supplied through said generator output lines and successively illuminated under control of said lighting control circuit.

7. Information display device as claimed in claim 5 in which the indicators on said diagram are destination lamps located at the locations on said diagram listed on said indicating table.

8. Information display device as claimed in claim 7 comprising also a series of route lamps positioned along the routes on said diagram leading to the locations listed on said indicating table from a common starting point, each destination lamp being electrically connected to the nearest route lamp and the lighting of each destination lamp causing the lighting of all the route lamps between that destination lamp and said common starting point.

9. Information display device as claimed in claim 5 in which the indicators on said diagram are positioned along the routes on said diagram leading to the locations listed on said indicating table from a common starting point.

10. Device as claimed in claim 8 in which said pulse generator comprises a rotating disc provided with perforations and a knob adapted to be actuated by the user, said disc being mounted to rotate in front of at least one light source and being interposed between said light source and at least three photoelectric cells, each of which supplies one output line of the generator assembly.

11. Device as claimed in claim 10 in which the rotating disc of the pulse generator comprises eight holes, the centers of which are regularly distributed about the circumference of a circle concentric with the center of the disc, said generator assembly comprising three supply lines and three photoelectric cells, two of which are 60 degrees apart and the third 150 degrees away from each of the other two.

12. Device as claimed in claim 5 in which the pulses produced by the pulse generator are supplied to the triggers of three thyristors through the three contacts of a relay controlling said output lines, a capacitance being connected in parallel between the outputs of each pair of thyristors so that the firing of one extinguishes the other.

13. Device as claimed in claim 12 in which the relay in the selector means is controlled by a transistor circuit rendered conductive by the reception of signals from the output of one of said thyristors and comprising a time delay capacitance holding said relay in its contact-closing position for a predetermined time.

14. A device as claimed in claim 13 comprising a lighting control circuit positioned in series between the circuit controlling the relay and a circuit controlling the scanning of the lamps on the indicating table.

15. Device as claimed in claim 14 in which the scanning circuit of the indicating table comprises an assembly of thyristors, each connected to one of three supply lines from the generator assembly, said thyristors being a multiple of three in number, each thyristor in a group being supplied by a different one of the three supply lines from the generator assembly, a lamp on the indicating table being positioned in series with the output of each thyristor, said lamps being so located on the indicating table so that scanning takes place continuously.

16. Device as claimed in claim 15 in which the trigger of each thyristor of the scanning circuit is connected to the output of the thyristor corresponding to the adjacent lamp so that the lighting of one thyristor energizes an adjacent thyristor, the trigger of one of said thyristors of the assembly being connected to the output of the lighting control circuit.

17. Device as claimed in claim 16 in which the lighting control circuit comprises a transistor which is rendered non-conductive when one of the scanned lamps of the indicating table has been lighted.

18. Device as claimed in claim 15 in which the destination lamps on the diagram are connected in series between the blocking circuit in the generator assembly and the outputs of the thyristors of the scanning control circuit for the indicating table.

19. Device as claimed in claim 18 in which the indicators on said diagram are destination lamps located at the locations on said diagram listed on said indicating table, and comprising a series of route lamps positioned along the routes on said diagram between said destination lamps and a position lamp at a common starting point, each route lamp being supplied by a thyristor, the trigger of which is connected to the output associated with the adjacent route lamp, so that the firing of one thyristor causes the firing of an adjacent thyristor.

20. Device as claimed in claim 19 in which the connection between a destination lamp and the nearest route lamp is made by connecting the output of one of the thyristors of the scanning control circuit to the trigger of the thyristor associated with the route lamp in question.

21. Device as claimed in claim 5 comprising both a manually actuated and an automatic pulse generator, in which the output of the manually controlled pulse generator is also connected to a monostable detecting the operation of said manually controlled pulse generator, said monostable controlling a bistable, the output of which may block said automatic pulse generator in dependence upon the position of the bistable, said automatic pulse generator being connected to the three triggers of three thyristors in parallel with the manual pulse generator, said bistable being connected to be returned to initial position by a time delay circuit which may be blocked through the output of the monostable for a certain delay period by the output of the bistable during rotation of the manually controlled generator.

22. A device as claimed in claim 21 in which the automatic pulse generator comprises an input permitting external control of its synchronization.

23. Device as claimed in claim 21 in which the automatic pulse generator comprises a unijunction transistor the base of which is subjected to a voltage supplied through a resistance capacitance circuit.

24. Device as claimed in claim 21 in which the monostable is connected to a photoelectric cell before which the perforated disc rotates.

25. Device as claimed in claim 21 in which the time delay circuit comprises a unijunction transistor the base of which is biassed through a resistance-capacitance circuit.

26. Device as claimed in claim 25 in which the trigger of one of the three thyristors supplying the relay is connected to the positive supply through a starting condenser.

27. Device as claimed in claim 26 in which the triggers of the three thyristors of the pulse generator assembly are connected in parallel to the output of the automatic pulse generator, a diode being positioned between the connection of each trigger and the output of one of the two adjacent thyristors, all three of said thyristors being mounted in a similar manner.

28. Device as claimed in claim 19 in which the route lamps and the thyristors associated therewith are arranged in sequences of N successive lamps, N being a number greater than one, each thyristor associated with a given route lamp being connected to a supply different from the one to which the adjacent thyristor is connected, the N conductors supplying the route lamps in a given sequence being each connected, on the one hand, to a source of normal lighting voltage, and, on the other hand, in parallel to a source of greater voltage, said last connection being through a thyristor or transistor, the gate or base of which is supplied by one of N outputs of the pulse generator, the N outputs of which are successively supplied in a constant order.

29. Device as claimed in claim 28 in which each sequence of route lamps comprises four lamps.

30. Device as claimed in claim 28 in which each supply line is connected to an alternating circuit transformer, on the one hand at a point intermediate the ends of the secondary winding through a diode, and, on the other hand, at one end of the secondary winding through a thyristor.

31. Device as claimed in claim 28 in which the pulse generator comprises a transistor the base of which is subjected to a voltage supplied by a resistance-capacitance circuit, the time constant of which is preferably adjustable, said transistor being connected to supply in parallel N thyristors, the N outputs of which are connected to the N gates of N thyristors associated with N conductors supplying the route lamps, the N thyristors of the pulse generator being so connected that the lighting of one causes extinction of the adjacent thyristor.

32. Device as claimed in claim 8 in which all the route lamps are positioned in series between the destination lamps and the position lamp and the assembly is supplied through a current regulator delivering a constant voltage.

33. Information display device comprising in combination an illuminated diagram, an indicating table carrying a list of locations on said diagram, and electronic selector means, said selector means comprising a generator assembly adapted to deliver a succession of pulses over at least three output lines and to supply said lines successively, but with over lapping periods in which two lines are simultaneously supplied, said indicating table being provided with a plurality of illuminable indicators each associated with a location listed thereon and connected to said generator assembly to be successively illuminated by the pulses therefrom, and said diagram carrying a plurality of illuminable indicators, each associated with a position of said diagram listed on said indicating table and connected to be lit whenever the corresponding indicator on said indicating board is lit and said pulse generator stopped.

* * * * *

UNITED STATES PATENT OFFICE
CERTIFICATE OF CORRECTION

Patent No. 3,824,591     Dated July 16, 1974

Inventor(s) PHILIPPE SIMON

It is certified that error appears in the above-identified patent and that said Letters Patent are hereby corrected as shown below:

[30]   Foreign Application Priority Data

December 3, 1970    France . . . . 70-43535

November 15, 1971   France . . . . 71-40780

Related U.S. Application Data

[63]   Continuation-in-part of Ser. No. 202,942,
       November 29, 1971, abandoned.

Signed and sealed this 7th day of January 1975.

(SEAL)
   Attest:

McCOY M. GIBSON JR.              C. MARSHALL DANN
   Attesting Officer                Commissioner of Patents